United States Patent Office 2,760,814
Patented Aug. 28, 1956

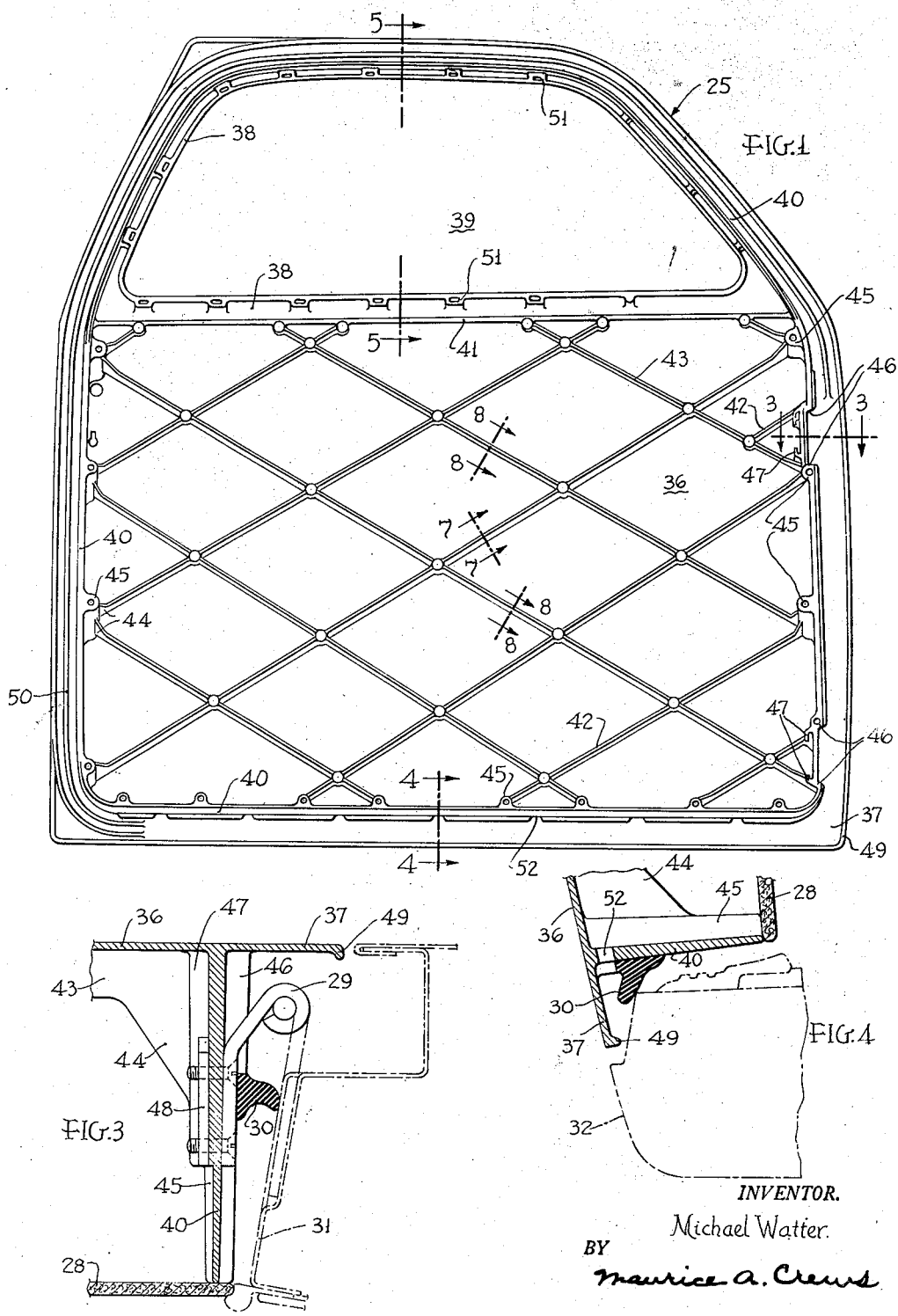

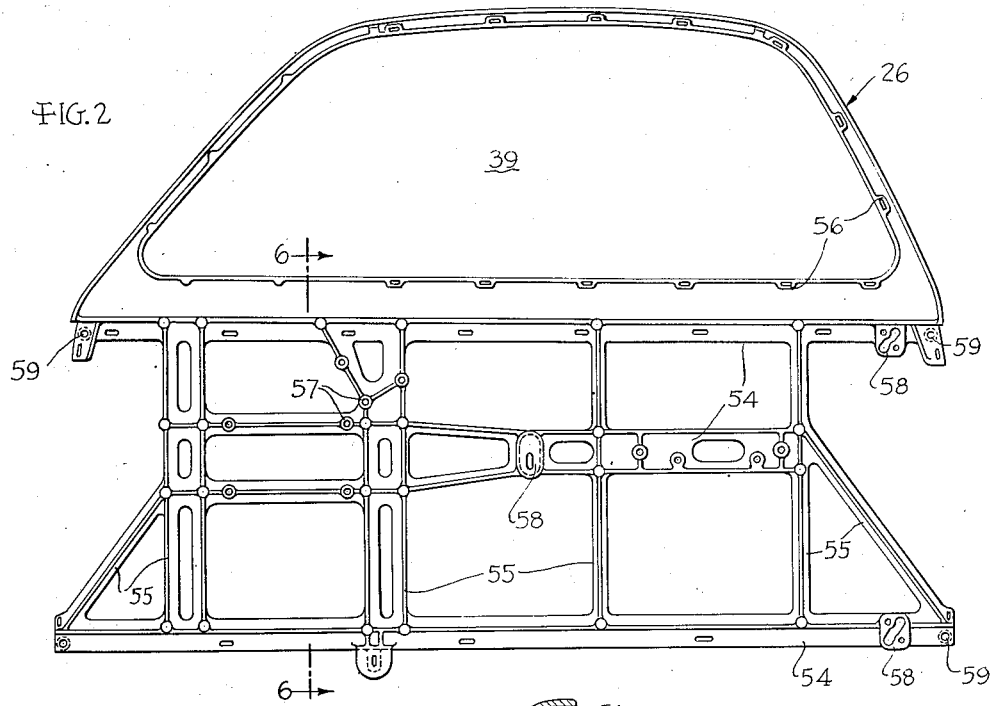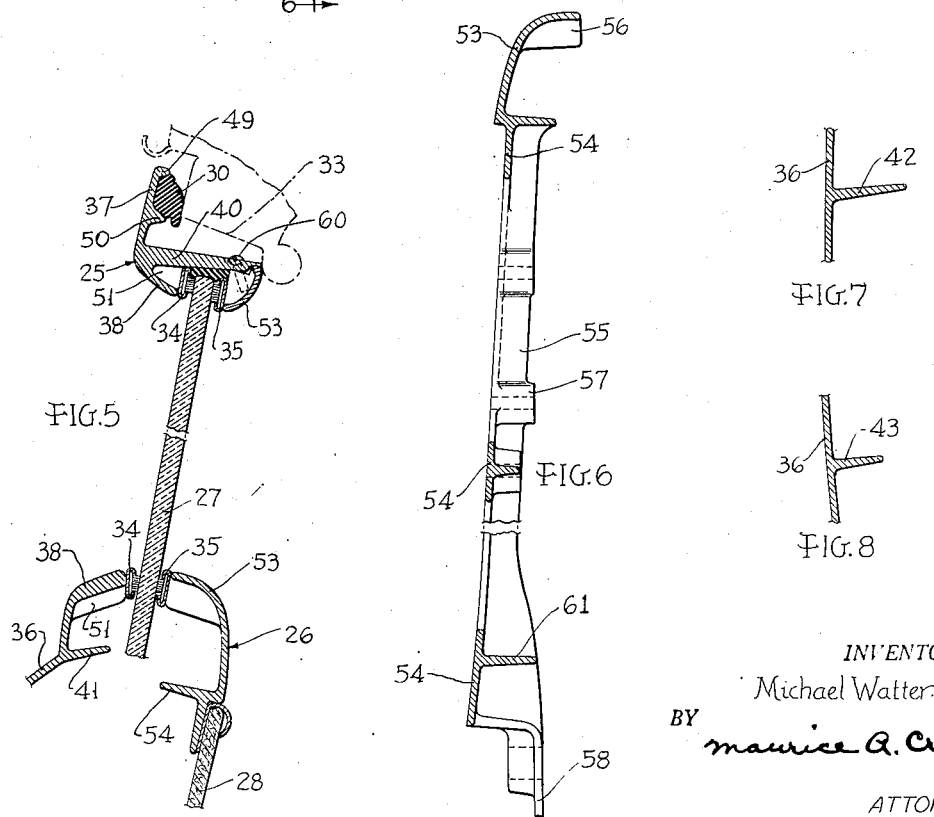

2,760,814

DOOR, PARTICULARLY FOR AUTOMOBILES, WITH REINFORCING RIBS

Michael Watter, Philadelphia, Pa., assignor to The Budd Company, Philadelphia, Pa., a corporation of Pennsylvania Application July 11, 1951, Serial No. 236,181

2 Claims. (Cl. 296—44)

The invention relates to doors, particularly for automobile bodies.

More specifically, the invention relates to doors which have an outer panel reinforced on the inside by ribs projecting inwardly from the panel.

Among the objects of the invention is the provision of a door of the indicated type combining great strength and rigidity with light weight, simple construction, and the possibility of economical manufacture.

A more specific object of the invention is a door which lends itself to manufacture by die casting.

These objects and other advantages are achieved by the provision of the outer panel of a door with thin but wide marginal flanges which form a frame, and with thin but wide diagonal ribs or webs interconnecting the marginal flanges so that the flanges and ribs impart strength and rigidity to the door as a whole and also form a strong support for the outer panel.

The above and further objects, advantages, and features of the invention are more fully explained in the following description of one embodiment of the invention which is illustrated in the attached drawing.

In the drawing:

Fig. 1 is an inside elevation of the outer panel and framework of an automobile door, illustrating one embodiment of the invention;

Fig. 2 is an outside elevation of an inner structure combining a window retainer molding with lock and window regulator support, and being designed for assembly with the structure shown in Fig. 1;

Figs. 3, 4, and 5 are fragmentary sections, on a larger scale, along the correspondingly numbered lines of Fig. 1, showing the completed door and, in dot-and-dash lines, the adjoining body wall;

Fig. 6 is a fragmentary section on a larger scale along line 6—6 of Fig. 2; and

Figs. 7 and 8 are fragmentary sections, on a larger scale, along the correspondingly numbered lines of Fig. 1.

The door illustrated in the drawing comprises an outer main body or unit 25 (Fig. 1), an inner unit 26 (Figs. 2, 5, 6), a window 27 (Fig. 5), an inner trim panel 28 (Figs. 3 to 5), hinges 29 (Fig. 3), sealing strips 30 (Figs. 3 to 5), window guides 34, 35 (Fig. 5), and other (not shown) accessories such as window regulator and lock.

The door fits into and is supported by the body framework, of which are diagrammatically illustrated by dot-and-dash lines: the hinge post 31 in Fig. 3, the threshold 32 in Fig. 4, and the header 33 in Fig. 5.

The outer unit 25 is preferably a one-piece die casting. It forms the outer panel 36, including the overlap flange 37 and the outer molding 38 around the window opening 39 (see Figs. 1 and 5).

Panel 36 is reinforced and supported by a continuous peripheral flange 40 which forms the main frame of the door and the lateral and top sides of the window frame. This flange is, as shown in the drawing, a wide but thin web, the width being substantially equal to the width of the entire door. A horizontal web 41 interconnects opposite webs 41 below molding 38 under window opening 39.

Further thin but wide webs 42, 43 are formed on the inside of panel 36 in the region below window opening 39. These webs extend diagonally and intersect each other as shown in Fig. 1. Certain of the webs, such as the webs 42 (Fig. 7), are preferably wider than other webs, such as the webs 43 (Fig. 8).

The webs 42, 43 have widened ends 44 where they join with thickened portions 45 of the frame webs 40 and 41.

Hinges 29 are received between offsets 46 of frame web 40, and a similar recess 47 is formed on the inner side of the web for the reception of a threaded hinge attachment plate 48 (see Figs., 1 and 3). The hinge locations are adjoined on top and bottom by the ends of diverging webs 42, 43 (Fig. 1), so as to effectively transmit the stresses to and from the hinges.

Overlap flange 37 is reinforced by a marginal inwardly directed beading 49 and, at least over part of its length, with an inwardly spaced beading 50. Beadings 49, 50 provide between them a recess for the attachment of weatherstrip 30.

Lugs or ears 51 formed on molding 38 and between molding 38 and frame webs 40, 41 serve for the attachment of window guide members 34 (see Figs. 1 and 5). Frame web 40 is provided at the bottom with drain holes 52 (Figs. 1 and 4).

Throughout the structure the webs or flanges taper inwardly so as to permit withdrawal of the finished casting from a mold. The width of the flanges or webs 40, 41, 42, 43, their small thickness and arrangement, and the provision of reinforced regions for the attachment of hinges, window guides, etc., results in a door structure which combines light weight and economical manufacture, with great strength and rigidity.

Though the door structure is particularly intended for die-casting of a light-metal alloy, it may also be manufactured wholly or in part of sheet metal.

The inner or window retaining unit 26 (Figs. 2, 5, and 6) is preferably likewise a die-casting. It forms the inner window molding 53 proper and a downwardly projecting skeleton framework comprising horizontal frame members 54 and vertical and diagonal frame members 55. Molding 53 is provided with lugs or ears 56, corresponding to the lugs 51 of the outer unit, and serving likewise for the attachment of window guide members 35.

The framework 54, 55 is provided with reinforced regions and holes such as indicated at 57, 58 (Figs. 2 and 6). These reinforcements are adapted for the securement of (not shown) window regulator and the lock mechanism.

Holes 59 at the ends of the upper and lower frame members 54 serve for the attachment of inner unit 26 to reinforced regions 45 of outer unit 25 by means of screws or bolts. Further screws 60 secure sides and top of molding 53 to web 40 (Fig. 5).

The inner unit 26 is similarly constructed as the outer unit inasmuch as it has thin, narrow reinforcing flanges 61. Its component parts are throughout of generally T- or U-section (Fig. 6).

The inner unit 26 may be inserted or removed, together with lock, window regulator, window guide, and window pane 27.

The invention is not restricted to the illustrated embodiments but, as should be obvious, is susceptible to modifications and adaptations so as to comply with specific designs, ornamentations, etc., of different types of bodies.

What is claimed is:

1. Door for closed automobile bodies surrounding a window opening, said door consisting of an integral main body and a removable inner molding member; said main body being in the form of a one-piece die-casting and comprising a panel forming the outer panel below the window opening and the overlap flanges along all its sides including the upright and the top side of the window opening, a thin but wide peripheral flange extending inwardly from said panel, an inwardly projecting molding surrounding the window opening; said inner molding member being formed as a one-piece die-casting, together with a supporting structure for a window regulator and a lock mechanism; said main body and said inner molding member being provided with complementary parts for connecting them to each other.

2. Door for closed automobile bodies surrounding a window opening, said door including a main body and a removable inner molding member; said main body comprising an outer panel below and around the window opening, an inwardly projecting molding around the window opening and a peripheral frame extending inwardly from the margins of said panel; said inner molding member being formed as a one-piece die-casting comprising an outwardly projecting molding surrounding the window opening as well as a supporting structure for a window regulator and a lock mechanism, said supporting structure being adapted for direct connection to said peripheral frame of said main body.

References Cited in the file of this patent

UNITED STATES PATENTS

| | | |
|---|---|---|
| 1,416,816 | Gravel | May 23, 1922 |
| 1,859,563 | Joekel | May 24, 1932 |
| 1,967,620 | Kahn | July 24, 1934 |
| 2,145,659 | Lane | Jan. 31, 1939 |
| 2,187,331 | Schulz et al. | Jan. 16, 1940 |
| 2,349,907 | Kos et al. | May 30, 1944 |
| 2,490,321 | Perhach | Dec. 6, 1949 |
| 2,566,871 | Bedford et al. | Sept. 4, 1951 |

FOREIGN PATENTS

| | | |
|---|---|---|
| 347,378 | Great Britain | Apr. 30, 1931 |
| 149,865 | Switzerland | Sept. 30, 1931 |